US009522835B2

(12) United States Patent
Kuhn

(10) Patent No.: US 9,522,835 B2
(45) Date of Patent: Dec. 20, 2016

(54) FURNACE FOR MELTING BATCH MATERIALS

(75) Inventor: Wolf Stefan Kuhn, Fontenay le Vicomte (FR)

(73) Assignee: FIVES STEIN (FR)

( * ) Notice: Subject to any disclaimer, the term of this patent is extended or adjusted under 35 U.S.C. 154(b) by 22 days.

(21) Appl. No.: 13/388,323

(22) PCT Filed: Aug. 6, 2010

(86) PCT No.: PCT/IB2010/053565

§ 371 (c)(1),
(2), (4) Date: Mar. 21, 2012

(87) PCT Pub. No.: WO2011/016007

PCT Pub. Date: Feb. 10, 2011

(65) Prior Publication Data

US 2012/0167632 A1 Jul. 5, 2012

(30) Foreign Application Priority Data

Aug. 7, 2009 (FR) ..................................... 09 03898

(51) Int. Cl.
*C03B 5/04* (2006.01)
*C03B 5/235* (2006.01)

(52) U.S. Cl.
CPC ................. *C03B 5/04* (2013.01); *C03B 5/235* (2013.01); *Y02P 40/55* (2015.11)

(58) Field of Classification Search
CPC ...... C03B 5/2353; C03B 5/2356; C03B 5/235; C03B 3/02; C03B 5/04; C03B 3/00; C03B 2205/72;C03B 5/16; C03B 5/0332; C03B 5/0334; C03B 5/183; C03B 5/185; C03B 5/24; C03B 7/06; C03B 7/065
(Continued)

(56) References Cited

U.S. PATENT DOCUMENTS 1,893,060 A * 1/1933 Peiler ........................ C03B 7/00 65/135.1
3,224,854 A * 12/1965 Badger ..................... C03B 1/00 266/200

(Continued)

FOREIGN PATENT DOCUMENTS

FR 2888577 A1 1/2007
SU 563363 A1 6/1977

(Continued)

OTHER PUBLICATIONS

W. H. Manring et al., Influence of Batch Preparation Process on the melting and fining of glass, The Glass Industry, Jul. 1964, p. 354-357.

*Primary Examiner* — Jodi C Franklin
(74) *Attorney, Agent, or Firm* — The Belles Group, P.C.

(57) ABSTRACT

Furnace for melting batch materials comprising: a tank (3) covered by a crown (4); a combustion zone (5) provided with burners (6); an inlet (8) for charging it with the batch materials; a downstream outlet for the melted materials, the tank containing a melt (7) when the furnace is operating and the batch materials forming a batch blanket (G) that floats on the melt and is progressively melted; the furnace includes, near the charging inlet (8), an intense heating means (B), predominantly covering the width of the batch blanket, for melting a surface layer of the materials introduced and for increasing the emissivity of the batch blanket.

20 Claims, 1 Drawing Sheet

Figure 1:
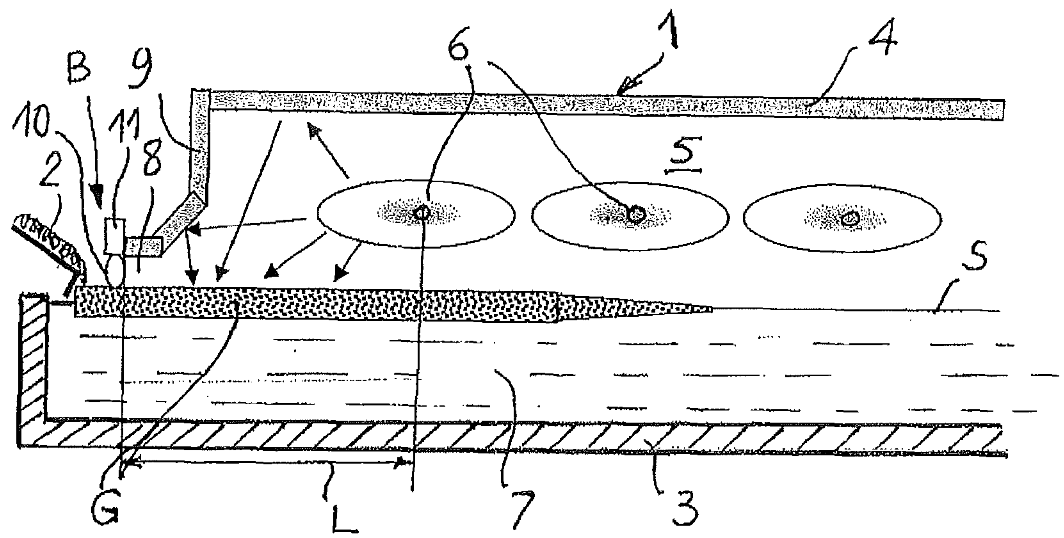

(58) Field of Classification Search
USPC ............ 65/33.2, 134.1–136.4, 335–345, 347
See application file for complete search history.

(56) References Cited

U.S. PATENT DOCUMENTS 3,574,585 A * 4/1971 Robertson et al. ....... C03B 5/04 65/135.8
3,592,623 A * 7/1971 Shepherd .............. C03B 5/2353 65/134.4
3,741,742 A * 6/1973 Jennings ................... C03B 3/00 65/136.2
3,885,945 A * 5/1975 Rees ......................... C03B 5/03 373/29
4,029,489 A * 6/1977 Froberg .................. C03B 5/235 373/29
4,381,934 A * 5/1983 Kunkle ..................... C03B 5/14 65/134.4
4,432,780 A * 2/1984 Propster .................... C03B 3/00 134/2
4,473,388 A * 9/1984 Lauwers ............... C03B 5/2353 432/20
4,496,387 A * 1/1985 Heithoff .................... C03B 3/00 266/219
4,604,121 A * 8/1986 Demarest, Jr. .......... C03B 3/023 65/134.4
4,654,068 A * 3/1987 Kunkle ..................... C03B 5/14 266/213
4,973,346 A * 11/1990 Kobayashi ............ C03B 5/2353 65/134.4
5,057,140 A * 10/1991 Nixon ....................... C03B 3/00 65/136.1
5,401,167 A * 3/1995 Martin .................... F23D 14/20 239/132.3
5,588,978 A * 12/1996 Argent ...................... C03B 3/00 373/27
5,655,464 A * 8/1997 Moreau ................. C03B 5/2353 110/335
5,713,977 A * 2/1998 Kobayashi .............. C04B 7/432 65/134.4
5,795,363 A * 8/1998 Pecoraro ............... C03B 5/1672 65/134.4
6,237,369 B1 * 5/2001 LeBlanc ................... C03B 5/04 65/134.1
6,253,578 B1 * 7/2001 Kobayashi ............ C03B 5/2353 65/134.4
6,422,041 B1 * 7/2002 Simpson ................. C03B 5/193 65/134.4
6,519,973 B1 * 2/2003 Hoke, Jr. .............. C03B 5/2353 110/297
6,715,319 B2 * 4/2004 Barrow ................. C03B 5/2353 65/134.1
6,789,396 B2 * 9/2004 Olin-Nunez ............ C03B 5/235 65/134.1
7,143,610 B2 * 12/2006 Cabrera-Llanos ...... C03B 5/235 110/261
8,707,738 B2 * 4/2014 Sakamoto ................. C03B 3/00 65/136.2
2007/0119213 A1 * 5/2007 Simpson ................. C03B 5/193 65/157
2007/0197366 A1 * 8/2007 Aoki ......................... C03B 5/16 501/11
2008/0276648 A1 11/2008 Leconte
2010/0081103 A1 * 4/2010 Kobayashi .............. C03B 5/235 432/1
2010/0218558 A1 * 9/2010 Gross ........................ C03B 5/03 65/135.6
2010/0224619 A1 * 9/2010 Schoenberger ......... C03C 1/004 219/443.1
2011/0079050 A1 * 4/2011 Douxchamps ............ C03B 5/04 65/134.4
2011/0098171 A1 * 4/2011 Pedeboscq .............. C03B 5/193 501/32
2013/0111956 A1 * 5/2013 Douxchamps ........ C03B 5/2353 65/134.4
2014/0090423 A1 * 4/2014 Charbonneau ............ C03B 5/04 65/134.5

FOREIGN PATENT DOCUMENTS

SU 1167155 A * 7/1985 ............... C03B 1/00
WO WO-9931021 A1 6/1999

* cited by examiner

FURNACE FOR MELTING BATCH MATERIALS

PRIORITY

Priority is claimed as a national stage application, under 35 U.S.C. §371, to PCT/IB2010/053565, filed Aug. 6, 2010, which claims priority to French Application No. 09 03898, filed Aug. 7, 2009. The disclosures of the aforementioned priority applications are incorporated herein by reference in their entirety.

The invention relates to a glass furnace for melting batch materials, of the kind of those that comprise:

- a tank covered by a crown;
- a combustion zone provided with heating means, especially with burners;
- one or more ports for charging the furnace with the batch materials; and
- a downstream outlet for the melted materials, the tank containing a melt when the furnace is operating, the batch materials introduced forming a batch blanket that floats on the melt and is progressively melted.

The invention relates preferably to furnaces in which the energy for melting the batch materials is predominantly transmitted by thermal radiation onto the surface of the blanket. It applies to oxy-fuel combustion and air-fuel combustion furnaces, but it may also apply to other types of furnace, especially hybrid furnaces, that is to say furnaces operating partially with oxy-fuel combustion. In the case of a hybrid furnace, it is advantageous to use the flue gas of the oxy-fuel combustion section to preheat the batch materials.

It has been observed that the spectral emissivity of the batch materials containing little cullet, especially sand, in the unmelted state is low, around 0.2 in the 0.5 to 3.0 μm wavelength range. As a result, the energy arriving by thermal radiation on the surface of the blanket is largely reflected. Thus, over the length of the unmelted blanket surface, the thermal efficiency of the furnace is low. Once the batch blanket surface has reached the melting point, its emissivity greatly increases, to beyond 0.6, and therefore the heat transfer is improved. Depending on the size and the design of the furnace, the length of the unmelted surface may be up to 2 to 3 meters.

The object of the invention is, above all, to improve the absorption by the batch blanket of the thermal radiation coming from the crown, from the flames and from the combustion flue gas by suppressing the length of the unmelted batch blanket surface so as to improve the thermal efficiency of the furnace. The invention also makes it possible to shorten the length of the batch blanket, or to increase the output of an existing furnace.

According to the invention, a glass furnace for melting batch materials of the kind defined above is characterized in that it includes, near the point of entry of the batch blanket into the furnace, upstream of the point of entry or at said point of entry, at least one intense heating means predominantly covering the width of the blanket in order to melt a surface layer of the batch materials introduced and to increase the emissivity of the batch blanket.

Advantageously, the overmelting is carried out just upstream of the start of exposure of the batch materials to the thermal radiation of the furnace.

The average thickness of the melted surface layer is preferably at least 0.5 mm and may be a few millimeters.

The intense heating means may be formed by a curtain of flames that are downwardly directed from a line of burners extending above the batch blanket, in the direction perpendicular to the direction of flow of the batch materials.

As a variant, the intense heating means may be formed by an electromagnetic radiation emitter extending above the batch blanket, over the entire width of said blanket.

According to the invention, the intense heating is applied over a limited length, in the direction of flow of the batch materials, of less than 50 cm and advantageously less than 15 cm.

The intense heating generates a net heat flux transmitted to the batch blanket of greater than 200 kW/m$^2$ and advantageously greater than 300 kW/m$^2$.

The moisture in the batch materials generates steam when they are heated. Melting the batch materials also generates gases, especially $CO_2$. To encourage these gases to escape via the surface of the blanket, it is advantageous for the overmelted surface to be permeable. Thus, a pressure of gas is prevented from being established beneath the overmelted surface.

According to the invention, the intense heating is carried out discontinuously, either parallel or perpendicular to the direction of flow of the batch materials, so as to maintain, on the surface of the blanket, regions permeable to the gas coming from the blanket. Advantageously, the permeable regions are not covered with an overmelted layer.

Figure 2:
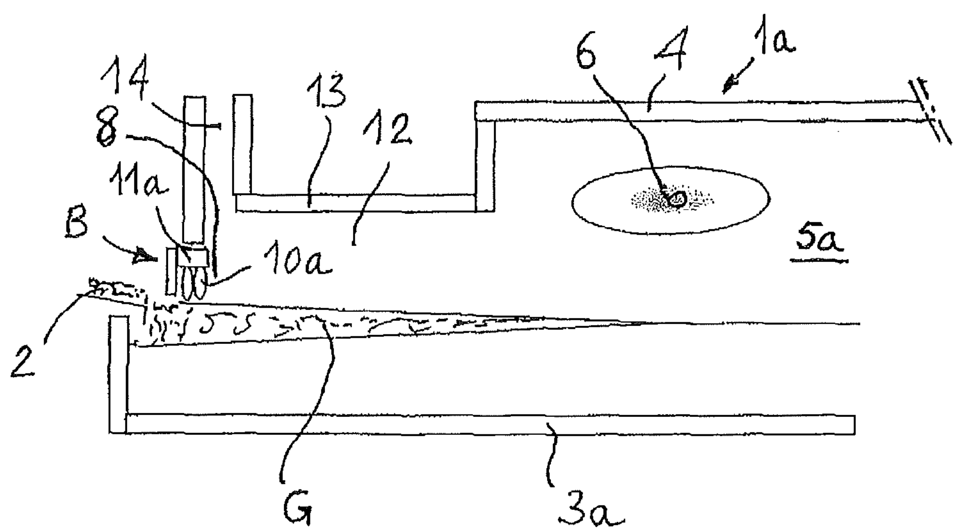

The invention consists, apart from the abovementioned arrangements, of several other arrangements which will be more explicitly discussed below in respect of exemplary embodiments described with reference to the appended drawing, although these are in no way limiting. In the drawing:

FIG. 1 is a partial longitudinal vertical section through a furnace for melting batch materials, FIG. 2 is a partial longitudinal vertical section through a furnace for melting batch materials that includes a recovery zone, according to the invention.

In FIG. 1 of the drawings may be seen a furnace 1 for heating and melting batch materials 2, which comprises a tank 3 covered by a crown 4. The terms "upstream" and "downstream" are to be understood as meaning along the direction of advance of the batch materials, that is to say along the direction going from the left to the right in FIG. 1.

The furnace includes a combustion zone 5 provided with heating means, generally formed by burners 6, so that the tank 3 contains a melt 7 when the furnace is in operation. An entrance is provided upstream of the furnace, for charging it with the batch materials 2. An outlet for the molten glass is located at the downstream end of the combustion zone 5. The connection of the crown between the combustion zone 5 and the entry zone 8 is made by means of a gable wall 9. The materials introduced at the entry point 8 form a batch blanket G that floats on the melt 7 and is progressively melted. The upper level of the melt 7 is denoted by the letter S.

According to the invention, the furnace includes, near the point of entry of the blanket into the furnace, an intense heating means B for melting a surface layer of the materials introduced, so as to increase the emissivity of the batch blanket right from the point of entry into the furnace and thus to improve the radiative heat transfer between, on the one hand, the batch blanket and, on the other hand, the flames, the flue gas and the crown. This solution is particularly advantageous for all furnaces having a low cullet content, such as furnaces for float glass, table glass, glass fiber, solar glass, etc.

According to FIG. 1, the intense heating means B is located just upstream of the entry point 8. The entry point 8 of the furnace is understood to mean the position of the start of exposure of the batch materials to the thermal radiation of the furnace.

The intense heating means B advantageously consists of a curtain of flames 10 that are downwardly directed from a line of burners 11 extending above the batch blanket, over the entire width of said blanket. The burners 11 are distributed over the entire width of the port for charging the furnace. The burners are fixed to a cross member above the batch blanket, being downwardly oriented.

The burners may be of the type for air-fuel combustion, oxy-fuel combustion or air-fuel combustion with the oxidant enriched with oxygen. It is important to ensure that the intense heating means do not cause batch material fly-off. Advantageously, the fuel is hydrogen and the oxidant is oxygen so as to limit the volume of gas generated by the combustion for a given power.

The heating means B may also be formed by an electromagnetic radiation emitter (not shown) extending above the batch blanket, over the entire width of said blanket, such as an infrared radiation, $CO_2$ laser or microwave device.

The intense heating means B, located between the port for charging the batch materials 2 and the point of entry 8 into the furnace, causes rapid overmelting of the surface layer of the batch blanket G. The thickness of the melted surface layer is of the order of a few millimeters, preferably at least 0.5 mm, and must allow an average emissivity of greater than 0.4 to be achieved.

This arrangement, which causes rapid overmelting of the surface layer of the batch blanket, substantially improves the emissivity of the blanket and the radiative heat transfer between the flue gas and the blanket.

To evaluate the improvement made by the intense heating means B, causing rapid overmelting of the surface layer of the batch blanket, a numerical simulation was carried out, in the case of a float glass furnace in air-fuel combustion mode, with the following assumptions:

- temperature of the laboratory in the initial portion of the furnace kept constant at 1300° C.;
- laboratory having an emissivity of 0.5, emitting radiation arriving on the batch blanket;
- output: 400 metric tons per day;
- cullet, 20% by weight;
- batch blanket width: 10 m; and
- average batch blanket speed at point of entry: 11 cm/min.

An intense heating means B was considered that injects a heat flux density of 300 kW/m$^2$ over a distance of 5 cm, which amounts to 150 kW as total injected net heat flux. Such a heat flux may for example be obtained by a line of oxy-fuel combustion burners. With an efficiency of around 60%, the total power of the burner line is 250 kW. The aim is for the surface of the batch blanket to be rapidly overmelted so as to increase its emissivity. The assumption made is that an emissivity of 0.6 is thus obtained.

The heat flux received at the surface of the blanket, over the first four meters from the entry point 8, is evaluated as:

- 2.6 MW in the conventional case, i.e. with no overmelting, with an average heat flux density of 65 kW/m$^2$; and
- 3.8 MW with overmelting, with a average heat flux density of 95 kW/m$^2$.

The overmelting therefore significantly increases the heat flux at the surface of the batch blanket in the furnace.

The overmelting also has the advantage of limiting batch material fly-off, carried away by the combustion flue gas of the furnace. In the case of a float glass furnace operating in air-fuel combustion mode, the result is a reduction in the amount of fouling of the regenerator of the first port. In addition, by limiting the amount of batch material fly-off, it is possible to shorten the distance L between the suspended or gable wall 9 and the first burner 6.

In FIG. 2 may be seen the tank 3*a* of a furnace 1*a* operating in oxy-fuel combustion mode and provided with a recovery zone 12 located in the furnace between the entry point 8 and the combustion zone 5*a*. The height of the crown 13 in the recovery zone 12 is less than the height of the crown 4 in the combustion zone. An opening 4 for the flue gas to escape is provided at the charging-side end of the recovery zone 12. In the recuperation zone, heat exchange takes place between the flue gas and the batch blanket G, causing the blanket to heat up.

In this recovery zone 12, the batch blanket G has a surface of low emissivity (about 0.2 for a low cullet content), thereby attenuating the radiative heat transfer.

According to the invention, an intense heating means B formed by a curtain of flames 10*a* is installed, the flames being downwardly directed from a line of burners 11*a* installed above the batch blanket, or by any other intense heating means. A high heat flux is produced at the point of entry of the batch blanket G in the recovery zone 12 so as to increase the emissivity of the blanket surface by rapid overmelting. The thermal efficiency of the recovery zone is thus improved. In the example shown in FIG. 2, the intense heating means B is located just at the point of entry 8, upstream of the recovery zone 12.

Advantageously, the flames 10*a* are directed slightly toward the interior of the furnace so that the flue gas resulting from these flames is recovered inside the furnace. A device for capturing the flue gas from these flames may also be placed outside the furnace, especially if the flames are not directed toward the interior of the furnace. The curtain of flames also has the advantage of creating an aeraulic seal limiting exchange between the atmosphere inside the furnace and that outside the furnace.

To evaluate the improvement provided by the intense heating means B, an example formed by a furnace operating in oxy-fuel combustion mode was considered, having an output of 400 metric tons per day, the batch materials containing 20% cullet by weight, the recovery zone having a length of 3.7 m and a width of 6.4 m, and the oxy-fuel combustion power of the furnace being 16 MW.

1. Numerical simulation of the recuperation with no overmelting, that is to say without the line of burners 11*a:*
   - flue gas energy recovered by the blanket in the recovery zone: 1.06 MW.
2. Recovery simulation with overmelting, that is to say with a line of burners 11*a:*
   - flue gas energy recovered by the blanket in the recovery zone: 1.36 MW.

In this example, the overmelting is obtained by a row of oxy-fuel combustion flames 10*a* of about 250 kW power, for a heat flux transmitted to the blanket of 150 kW.

Comparison of the two cases, with and without overmelting:

The energy of the line of burners is recovered by the blanket. Assuming that the combustion efficiency is similar for the two systems, burners in the furnace and overmelting burners, the overmelting therefore makes it possible to reduce the combustion consumption in the furnace by about 250 kW.

The net gain by solution 2 is therefore about 1.36 MW−1.06 MW=0.3 MW.

The efficiency of the recovery zone therefore increases by 28% and the furnace consumption drops by about 2% (i.e. 0.3/16).

The invention claimed is:

1. A glass furnace for melting batch materials, the furnace comprising:

a tank covered by a crown;

a combustion zone;

first heating means disposed within the combustion zone;

one or more ports for charging the furnace with the batch materials at an entry point of the furnace; and a downstream outlet for the melted materials, the tank containing a melt when the furnace is operating, the batch materials introduced forming a batch blanket that floats on the melt and is progressively melted, wherein the furnace further includes:

a heat recovery zone disposed between the entry point and the combustion zone, the heat recovery zone including a flue gas escape positioned nearer the entry point than the first heating means, second heating means disposed between the one or more charging ports and the entry point above the batch blanket, the second heating means distributed over the entire width of the batch blanket, the second heating means configured to generate a net heat flux transmitted to the batch blanket of greater than 200 $kW/m^2$ to melt a surface layer of the batch materials introduced and to increase emissivity of the batch blanket to an average emissivity of greater than 0.4, and wherein a height of the crown throughout the heat recovery zone is less than a height of the crown in the combustion zone, so that the crown is closer to the batch blanket in the heat recovery zone; and wherein the first and second heating means are placed outside of the heat recovery zone so that heat exchange takes place between flue gas and the batch blanket within the heat recovery zone.

2. The furnace as claimed in claim 1, wherein the at least one of the first heating means and the second heating means comprise burners.

3. The furnace as claimed in claim 1, wherein the second heating means is configured to create a melted surface layer of the batch blanket having an average thickness of at least 0.5 mm.

4. The furnace as claimed in claim 1, wherein the second heating means is configured to create a melted surface layer of the batch blanket having an average thickness of a few millimeters.

5. The furnace as claimed in claim 1, wherein the second heating means applies intense heating over a limited length, in the direction of flow of the batch materials, of less than 50 cm.

6. The furnace as claimed in claim 5, wherein the limited length is less than 15 cm.

7. The furnace as claimed in claim 1, wherein the net heat flux transmitted to the batch blanket by the second heating means is greater than 300 $kW/m^2$.

8. The furnace as claimed in claim 1, wherein the second heating means is configured to apply heat to the batch blanket discontinuously, either parallel or perpendicular to the direction of flow of the batch blanket, so as to maintain, on the surface of the batch blanket, regions permeable to the gas coming from the batch blanket.

9. The furnace as claimed in claim 1, wherein the second heating means is formed by a curtain of flames that are downwardly directed from a line of burners extending above the batch blanket in the direction perpendicular to the direction of flow of the batch materials.

10. The furnace as claimed in claim 1, wherein the second heating means is formed by an electromagnetic radiation emitter extending above the batch blanket, over the entire width of said blanket.

11. A glass furnace for melting batch materials, the furnace comprising:

a tank covered by a crown; a combustion zone;

first heating means disposed within the combustion zone; one or more ports for charging the furnace with the batch materials; and a downstream outlet for the melted materials, the tank containing a melt when the furnace is operating, the batch materials introduced forming a batch blanket that floats on the melt and is progressively melted, wherein near a point of entry of the batch blanket into the furnace, the furnace further includes:

second heating means extending the width of the blanket, the second heating means configured to generate a net heat flux transmitted to the batch blanket of greater than 200 kW/m to melt a surface layer of the batch materials introduced and to increase emissivity of the batch blanket; and a recuperation zone disposed between the second heating means and the combustion zone, with a flue gas escape positioned nearer the second heating means than the first heating means within the recuperation zone, wherein a height of the crown in the recuperation zone is less than a height of the crown in the combustion zone, so that the crown is closer to the batch blanket in the recuperation zone; and wherein the first and second heating means are placed outside of the recuperation zone so that heat exchange takes place between flue gas and the batch blanket within the recuperation zone.

12. The furnace as claimed in claim 11, wherein the second heating means comprise burners.

13. The furnace as claimed in claim 11, wherein the second heating means is configured to create a melted surface layer of the batch blanket having an average thickness of at least 0.5 mm.

14. The furnace as claimed in claim 11, wherein the second heating means is configured to create a melted surface layer of the batch blanket having an average thickness of a few millimeters.

15. The furnace as claimed in claim 11, wherein the second heating means applies intense heating over a limited length, in the direction of flow of the batch materials, of less than 50 cm.

16. The furnace as claimed in claim 15, wherein the limited length is less than 15 cm.

17. The furnace as claimed in claim 11, wherein the net heat flux transmitted to the batch blanket is greater than 300 kW/m.

18. The furnace as claimed in claim 11, wherein the second heating means is configured to apply heat to the batch blanket discontinuously, either parallel or perpendicular to the direction of flow of the batch blanket, so as to maintain, on the surface of the batch blanket, regions permeable to the gas coming from the batch blanket.

19. The furnace as claimed in claim 11, wherein the second heating means is formed by a curtain of flames that are downwardly directed from a line of burners extending above the batch blanket in the direction perpendicular to the direction of flow of the batch materials.

20. The furnace as claimed in claim 11, wherein the second heating means is formed by an electromagnetic radiation emitter extending above the batch blanket, over the entire width of said blanket.

* * * * *